United States Patent [19]

Contat

[11] Patent Number: 4,835,823
[45] Date of Patent: Jun. 6, 1989

[54] SNAP-HOOK, PRIMARILY FOR ROCK-CLIMBING, AND ITS PROCESS OF MANUFACTURE

[75] Inventor: Bernard Contat, Cluses, France

[73] Assignee: Etablissements Contat Frères (S.A.), France

[21] Appl. No.: 175,594

[22] Filed: Mar. 29, 1988

Related U.S. Application Data

[63] Continuation of Ser. No. 883,025, Jul. 10, 1986, abandoned, which is a continuation of Ser. No. 523,672, Aug. 16, 1983, abandoned.

[30] Foreign Application Priority Data

Aug. 18, 1982 [FR] France .................. 82 14271

[51] Int. Cl.⁴ .................................. A44B 13/02
[52] U.S. Cl. ................................ 24/234; 24/241 P
[58] Field of Search ......... 24/232 R, 233–235, 24/241 PS, 241 P, 241 SP; 59/88, 89; 269/249

[56] References Cited

U.S. PATENT DOCUMENTS

| | | | |
|---|---|---|---|
| D. 143,096 | 12/1945 | Sasgen | 269/249 X |
| 285,962 | 10/1883 | Bracken | 26/232 X |
| 340,838 | 4/1886 | Walters et al. | 24/232 X |
| 779,972 | 1/1905 | Rowland et al. | 26/241 PS |
| 948,980 | 2/1910 | Tischler | 269/249 |
| 1,237,525 | 8/1917 | Keator | 269/249 |
| 1,256,101 | 2/1918 | Baxter | 24/235 |
| 2,246,630 | 6/1941 | Johnson | 24/234 X |
| 4,095,316 | 6/1978 | Gabriel | 24/231 X |
| 4,309,052 | 1/1982 | Drayton | 24/232 R X |
| 4,333,212 | 6/1982 | Bibollet | 24/234 X |

FOREIGN PATENT DOCUMENTS 2437815 2/1976 Fed. Rep. of Germany ........ 24/232

Primary Examiner—James R. Brittain
Attorney, Agent, or Firm—Larson and Taylor

[57] ABSTRACT

A snap-hook for use with ropes or the like, primarily for rock-climbing, made up of a body or hook in the shape of a "C" of which the straight rear central portion is extended by two curved arms, one upper, the other lower, of which the free ends are joined, on closing the snap-hook, by a pivoting finger moving on one of these two ends, said snap-hook comprising an internal periphery having an essentially semi-circular cross-section and an external periphery which is formed, on at least the whole length of the upper and lower arms, of a rib of uniform section, designed to increase the rigidity of the said upper and lower arms, without increasing, and even lightening, the weight of the snap-hook.

1 Claim, 3 Drawing Sheets

SNAP-HOOK, PRIMARILY FOR ROCK-CLIMBING, AND ITS PROCESS OF MANUFACTURE

This application is a continuation of application Ser. No. 883,025, filed July 10, 1986, abandoned, which is a continuation of application Ser. No. 523,672, filed Sept. 16, 1983, abandoned.

FIELD OF THE INVENTION

The present invention relates to a snap-hook, primarily for rock-climbing, and its process of manufacture.

BACKGROUND OF THE INVENTION

Snap-hooks are, as is well known, made up of a body or hook in the form of a "C" of which rear, straight, central portion is extended by two curved loops, one at the top and one at the bottom, the free ends of which are connected, to close the snap-hook, by a pivoting finger moving on one of the two ends.

It is necessary for it to be both sufficiently strong and as light as possible. Its strength guarantees the safety of the climber. Its longitudinal tensile strength (breaking load along the direction of the above-mentioned rear central portion) can reach about three tonnes, whilst its transverse tensile strength (breaking load of the ring formed by the snap-hook, in a direction perpendicular to the rear central portion) is about one tonne. This strength must be balanced against the lightness of the snap-hook so as not to over-weight the climber's equipment. Also, the ropes passed through the snap-hook must not, when under tension, be damaged by the snap-hook. It follows that the internal rim of the snap-hook must offer to the tautened ropes a semi-circular cross-section of adequate radius.

Attempts have been made to lighten the weight of the snap-hook in various ways. Whilst retaining a solid body, some snap-hooks have been made, not in steel, but in light aluminium alloys, some cast, some obtained by bending of circular section bar. On the other hand, some snap-hooks, in steel or other metals of comparable rigidity but of higher density than that of aluminium alloys, have been made from hollow tube. This is so in the case of snap-hooks whose external section is uniformly circular, described, for instance, in French Pat. Nos. 975.004, 70.30809 (2.060.668) and 77.04399 (2.342.423).

SUMMARY OF THE INVENTION

The snap-hook according to the present invention is of a different design, and whether its body is solid or hollow, it offers against the previously described types of snap-hook the advantage of considerably increased rigidity/weight ratio and therefore also strength/weight ratio.

According to the main feature of the invention, its internal periphery presents an essentially semi-circular section, and its external periphery is in the form of, on at least the whole length of the upper and lower arms, a uniform section rib, designed to increase the rigidity of the said upper and lower arms, without increasing, and even reducing, the weight of the snap-hook.

According to another features of the invention, the sides of this rib, preferably symmetrical about the plane of the snap-hook, provide a concave section which can be curved, in the arc of a circle, or angled in an "L", the sides of the rib thus being flat and parallel, more or less distant one from the other.

According to the process of manufacture of this snap-hook, the said rib is obtained by forming, either before, during or after bending of a solid metal bar or metal tube, a uniform section, of the same cross-section as the rib, on the external periphery and at least along the whole length of the two ends of the bar or tube which, after bending, form the two arms of the snap-hook.

By means of a preferred method of implementing this process for making a hollow snap-hook, in accordance with the invention, said section is obtained, the entire length of the two arms, at the same time as the bending, by deformation of the said ends by means of formers, profiled to the sides of the rib, which approach simultaneously, obliquely in relation to the plane of the snap-hook, working the metal and impressing the shape of the two sides of the rib.

By means of a preferred method of implementing this process for making a solid snap-hook, in accordance with the invention, said section is, prior to the bending of the bar, obtained along the entire length of this bar, by casting, extrusion or longitudinal working of it, the said rib, which extends around the entire external periphery of the snap-hook, thus being formed before the bending of the arms.

The invention will be better understood, and other characteristics and advantages of it will appear more clearly, by referring to the following description and the attached drawings, which show two preferred versions of the snap-hook (hollow or solid), several variations in cross-section for them, as well as a preferred method of implementing the process for the manufacture of a hollow snap-hook, cited by way of non-restricting examples.

DESCRIPTION OF THE PREFERRED EMBODIMENTS

Figure 1:
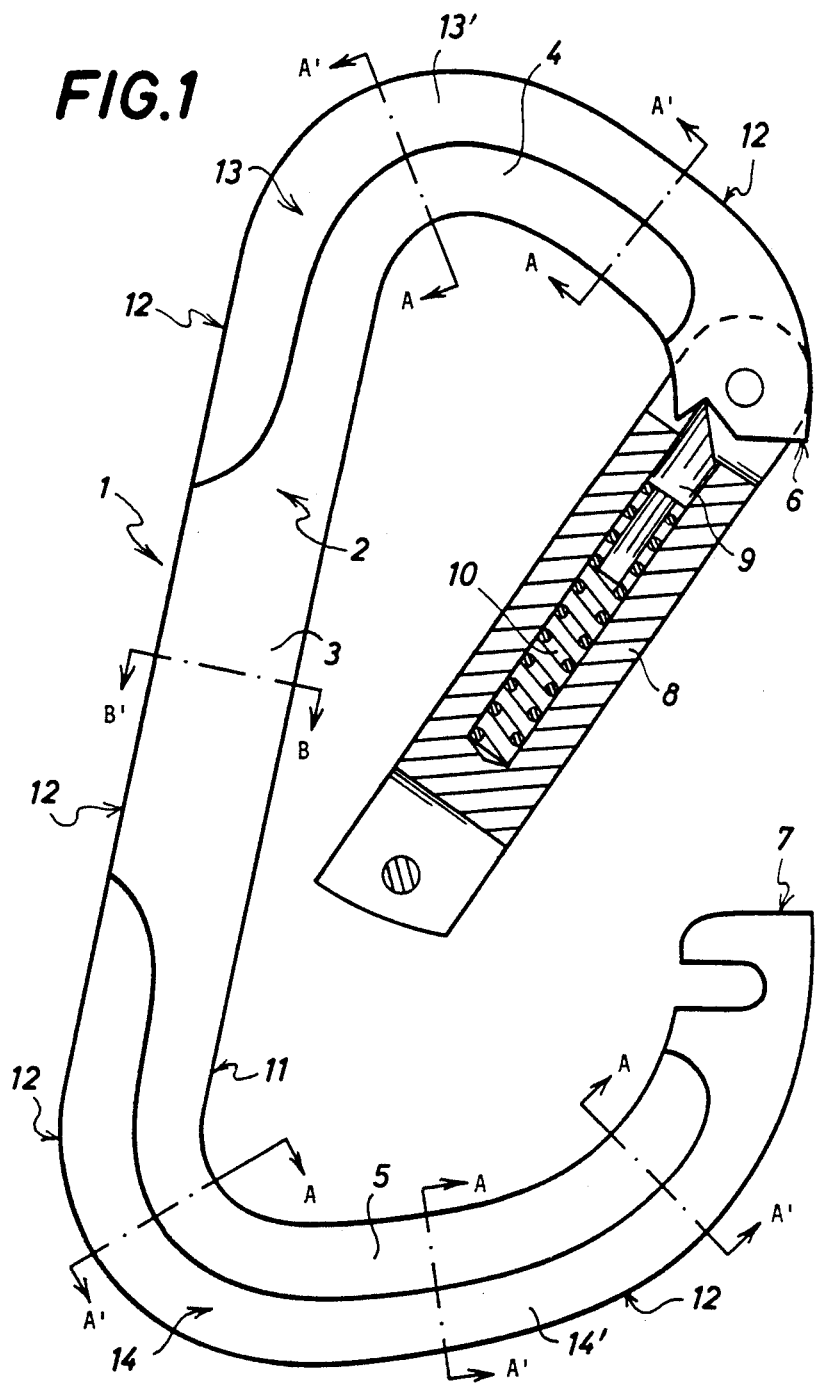
FIG. 1 represents a hollow snap-hook, of the first preferred form.
Figure 3:
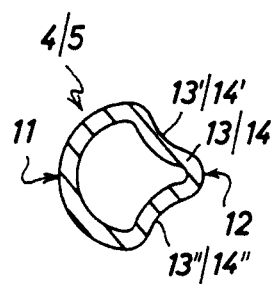
FIG. 3 is a section along lines A—A' of FIG. 1.
Figure 8:
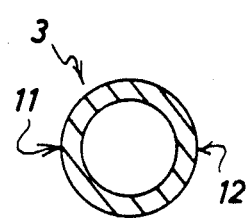
FIG. 8 is the section along line B—B' of FIG. 1.

Referring to FIGS. 1, 3 and 8, the hollow snap-hook 1 is, as usually, made of a body or hook 2, in the form of a "C" with straight rear central portion 3, extended to two curved arms, one, 4, at the top, the other, 5, at the bottom, with the free ends, 6 and 7 respectively, joined on closing the snap-hook, by a pivoting finger 8, hinged to the upper arm 4 and locked in the closed position by a catch 9 with spring 10; finger 8 being shown, in longitudinal section, in the open position.

The internal periphery 11 of the snap-hook 1 has an essentially semi-circular cross-section (FIGS. 3 and 8).

Following the essential characteristics of this invention, the external periphery 12 of the snap-hook 1 is made up, over the length of upper arm 4 and lower arm 5, of ribs 13 and 14 respectively, with sides 13' and 13", 14' and 14" respectively, symmetrically about the plane of the snap-hook (plane of FIG. 1). In the example shown, these sides have a curved concave section, in the arc of a circle, and, in the rear central portion 3, tail off to conserve, in the central part of this portion, a circular cross-section along line B—B' (FIGS. 1 and 8).

Figure 4:
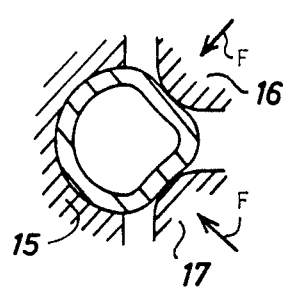
FIGS. 4 and 5 show two successive phases in the forming of the section FIG. 3, by operating procedures of this invention.
Figure 5:
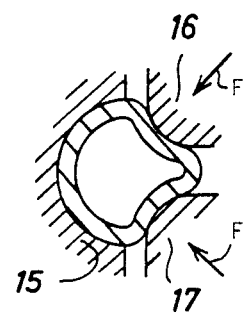

The hollow snap-hook 1 is made from a cylindrical tube of steel or similar metal, of the same uniform circular section as that of the said central section (FIG. 8), by using the following process, described with reference to FIGS. 4 and 5:

The tube being supported on counter former 15, formed with a supporting peripherical groove, of semi-circular section with radius equal to the external radius of the tube, the two ends are bent to form the two arms 4 and 5, upper and lower, at the same time deforming these ends by means of formers 16 and 17, profiled to the sides 13' and 13", 14' and 14" of ribs 13 and 14 respectively, the said formers 16 and 17 both approaching obliquely in relation to the plane of the snap-hook (in the direction of arrows "F"), pressing progressively (from FIG. 4 to FIG. 5) the metal of these ends and forming in them the sides 13', 13", 14', 14" of the ribs 13 and 14 respectively (FIG. 5).

By using formers of different profiles to those of formers 16 and 17 shown in FIGS. 4 and 5, one may obviously obtain different profiles for sides 13', 13", 14', 14" of ribs 13 and 14 respectively, for example an "L" profile (FIGS. 6 and 7), these sides being flat and parallel.

Figure 6:
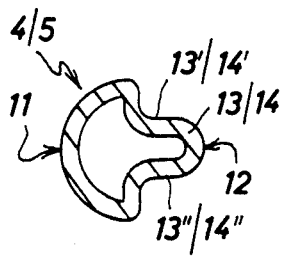
FIGS. 6 and 7 show two variants of the section along lines A—A' of FIG. 1.
Figure 7:
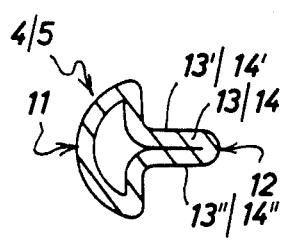

The section shown in FIG. 6 is obtained by maintaining a gap between the parallel sides, which gives the rib itself a "U" section, whereas that of FIG. 7 is obtained by nipping the metal, the two parallel sides being pressed face to face.

Referring now to FIGS. 2, 9, 10 and 11, the solid snap-hook 18 shows the known layout of the same elements 2,6,7,8,9 and 11 as the hollow snap-hook 1 of FIG. 1.

Figure 2:
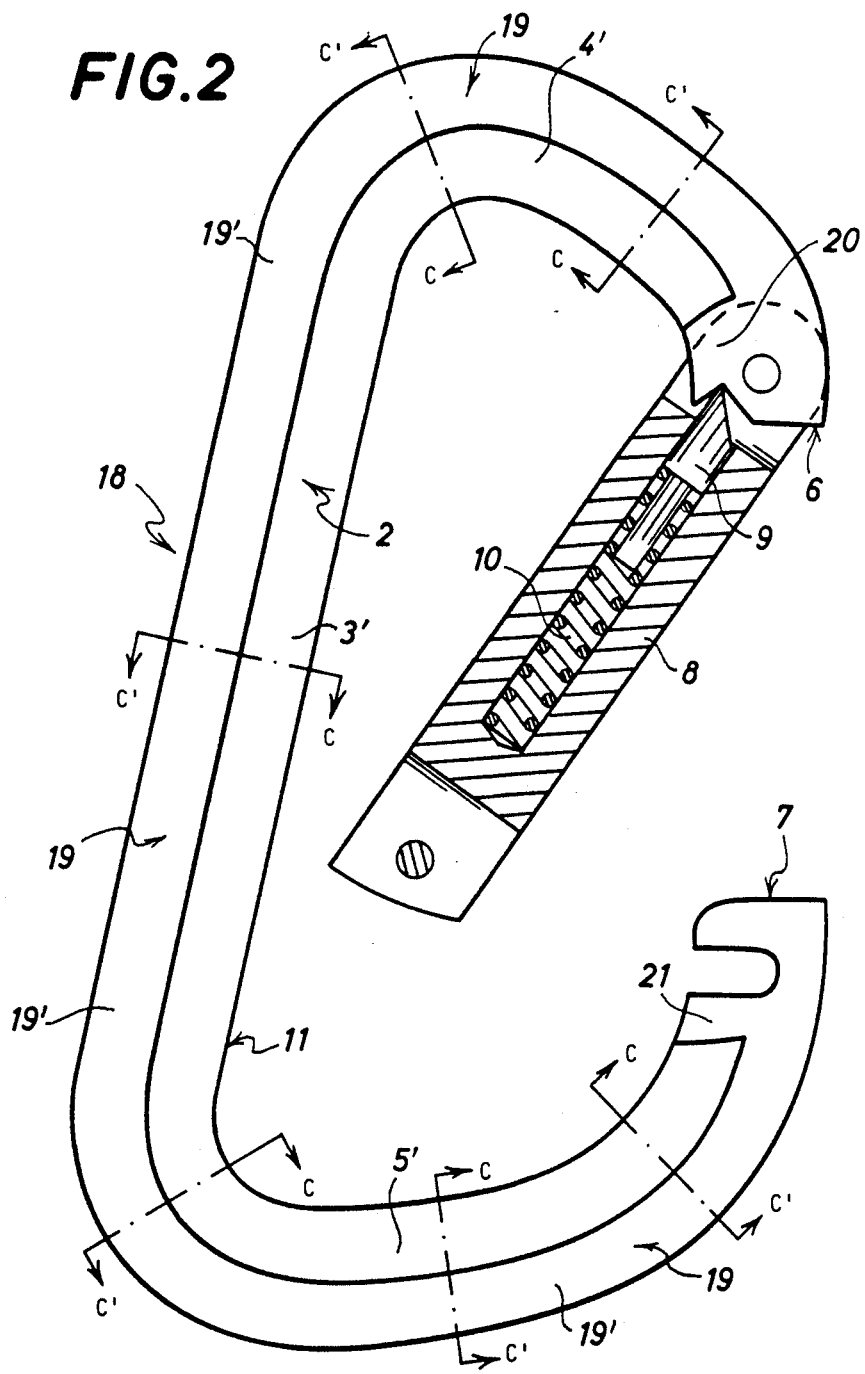
FIG. 2 represents a solid snap-hook, of the second preferred form.
Figure 9:
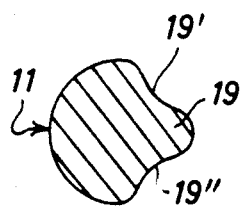
FIG. 9 is the section along lines C—C' of FIG. 2, FIGS. 10 and 11 represent two variants of this section along the same lines C—C' of FIG. 2.
Figure 10:
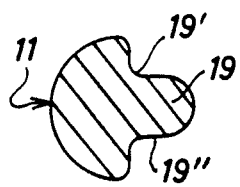
Figure 11:
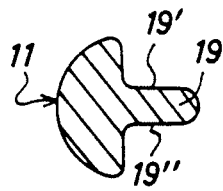

Its rear central portion 3', together with the upper and lower arms 4' and 5', show the same section, along lines C—C' of FIG. 2, shown in FIG. 9, and, in variants, FIGS. 10 and 11; sections which have the same profiles as those shown in FIGS. 3, 6 and 7 respectively. Its rib 19, with sides 19' and 19", extends around the entire external periphery.

The solid snap-hook 18 is, in the simplest way, formed by bending a bar initially profiled along its length into the uniform section shown along lines C—C' of FIG. 2. This profile may be formed by casting or extrusion, or else by machining (milling) of a bar of larger section.

Before or after bending, the arm ends 20 and 21 are formed by milling, so as to allow the fitting, free rotation, and locking of finger 8 to join the ends 6 and 7 of arms 4' and 5'.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

I claim:

1. A snap-hook for rock-climbing, for use with ropes and comprising a body in the shape of a "C" including a straight rear central portion and upper and lower curved arms extending therefrom, and a pivoted finger for joining the free ends of said curved arms, upon closing of the snap-hook, said straight rear central portion having a circular cross-section, and said upper and lower arms having an overall cross sectional area less than that of said circular cross section, the cross section of said upper and lower arms including an internal periphery of a semi-circular cross section having a radius equal to that of the circular cross section of said straight rear central portion, and an external periphery which is formed, along the whole length of said upper and lower arms, by a rib of uniform cross section designed to lighten the weight of the snap-hook without loss in the strength and the safety thereof and presenting curved concave surfaces, in the shape of an arc of circle in cross section, which are symmetrical with respect to the mid-plane of the body, a convex surface joining the curved concave surfaces and a middle portion, extending along the whole length of the said upper and lower arms, joining the said internal and external peripheries and including a pair of oppositely disposed convex curved surfaces which are symmetrical with respect to the mid-plane of the body, the curvature of said oppositely disposed curved surfaces and of all other convex surfaces of said peripheries being such that the ropes cannot be damaged by abrading when the ropes come into contact with either the external surface or the internal surface of said arms, during use of the snap-hook as the rope slides therein when tensioned by the weight of the body of a rock-climber using the snap-hook.

* * * * *